United States Patent [19]

Shindler

[11] Patent Number: 4,601,906
[45] Date of Patent: Jul. 22, 1986

[54] EXTRACTION PROCESS

[75] Inventor: Brian D. Shindler, West Midlands, England

[73] Assignee: Imperial Chemical Industries PLC, London, England

[21] Appl. No.: 659,527

[22] Filed: Oct. 10, 1984

[30] Foreign Application Priority Data

Oct., 1983 [GB] United Kingdom ............... 8327756

[51] Int. Cl.$^4$ .................... A61K 35/78; A23L 1/28
[52] U.S. Cl. ................................ 424/195.1; 426/425; 426/655
[58] Field of Search .............. 424/195.1; 426/655, 426/425

[56] References Cited

PUBLICATIONS

Brogle: "CO$_2$ as a Solvent: Its Properties and Applications," Chemistry and Industry, Jun. 1982, pp. 385-390.
de Filippi: "CO$_2$ as a Solvent Application to Fats, Oils and Other Materials," Chemistry and Industry, Jun. 1982, pp. 390-394.
Bott: "Fundamentals of Carbon Dioxide in Solvent Extraction", Chemistry and Industry, Jun. 1982, pp. 394-396.
Vollbrecht: "Extraction of Hops with Supercritical CO$_2$", Chemistry and Industry, Jun. 1982, pp. 397-399.
Calame et al.: "CO$_2$ Extraction in the Flavour and Perfumery Industries", Chemistry and Industry, Jun. 1982, pp. 399-402.
Gardner: "Industrial Scale Hop Extraction with Liquid CO$_2$", Chemistry and Industry, Jun. 1982, pp. 402-405.

Primary Examiner—Leonard Schenkman
Assistant Examiner—John W. Rollins
Attorney, Agent, or Firm—Cushman, Darby & Cushman

[57] ABSTRACT

An extraction vessel A is charged with a particulate solid, e.g. oilseed, and a transfer liquid, e.g. water, in an amount sufficient to pressurize vessel A to an elevated pressure. Extraction solvent, e.g. carbon dioxide, is introduced, preferably from a storage vessel B, to displace transfer liquid from vessel A. After extraction by the solvent, the latter may be displaced into vessel B by transfer liquid which is preferably stored under pressure in vessel B during the extraction.

The extraction solvent is gaseous at ambient conditions but preferably is liquid or a supercritical fluid at the displacement conditions.

13 Claims, 1 Drawing Figure

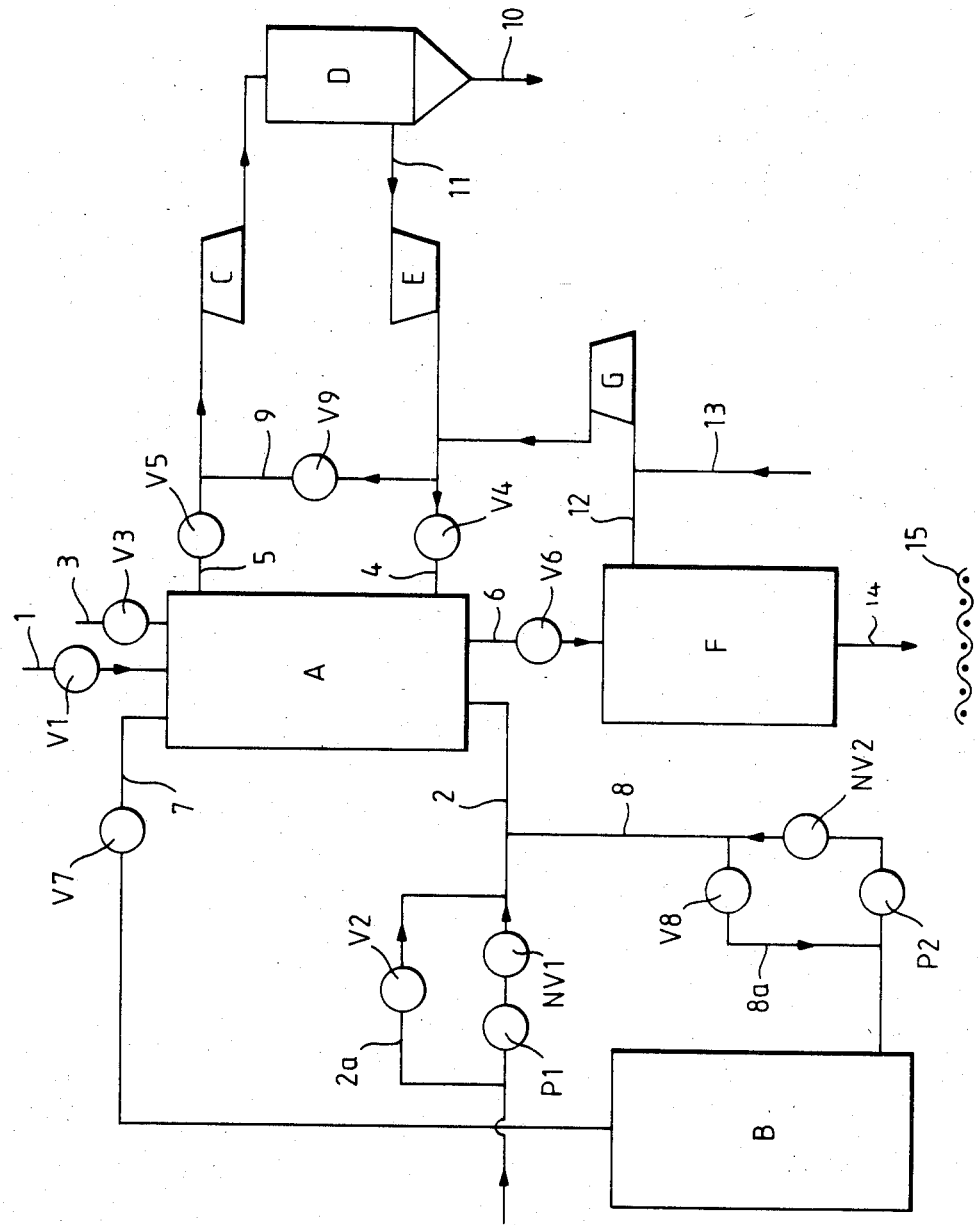

EXTRACTION PROCESS

This invention relates to an extraction process and in particular to an extraction process where material is extracted from a particulate solid at elevated pressure.

In such a process the particulate solid material, e.g. crushed seeds or beans, are charged to the extraction vessel and then the latter is pressurised to the required pressure with the extraction solvent. When the desired degree of extraction has been effected, the residual solids are discharged and the extraction vessel is refilled.

In order to simplify the separation of the extracted material from the extraction solvent, it is often desirable to use as the extraction solvent a material that is a gas at ambient temperature and atmospheric pressure.

At the extraction conditions such an extraction solvent may simply be a compressed gas but is preferably a liquid or supercritical fluid (by which term we mean a fluid at a temperature and pressure above the critical temperature and pressure of the fluid).

For example carbon dioxide has been proposed or used as an extraction solvent in a variety of extraction processes such as hop extraction, extraction of caffeine from coffee, and extraction of oils from oilseeds such as rape seed.

However, in a process using an extraction solvent that is gaseous at ambient temperature and atmospheric pressure there is a serious disadvantage that if the vessel, after charging with the solid material at temperature and pressure conditions at which the extraction solvent is a gas is simply pressurised by supplying the gaseous extraction solvent thereto, a great deal of work has to be performed to compress this gas to the extraction pressure.

We have devised a procedure whereby the energy consumption required for pressurisation is reduced.

Accordingly the present invention provides a process for the extraction of a material from a particulate solid comprising (a) charging to an extraction vessel the particulate solid and a transfer liquid, the amount of transfer liquid being such that the vessel is pressurised to an elevated pressure, (b) displacing the transfer liquid from the extraction vessel by transferring into the extraction vessel, at said elevated pressure, an extraction solvent that is gaseous at ambient temperature and atmospheric pressure, the transfer liquid being liquid both at ambient temperature and atmospheric pressure and at the pressure and temperature at which the displacement is effected, (c) extracting the material from the particulate solid with the extraction solvent, (d) separating the extracted material from the extraction solvent, and (e) after extraction of the material from the particulate solid, discharging the residue of the particulate solid from the extraction vessel.

In one form of the present invention the extraction vessel is charged with the particulate solid and transfer liquid at low, e.g. atmospheric, pressure so as to fill the extraction vessel and then the extraction vessel and contents are pressurised to the displacement pressure by increasing the pressure on the transfer liquid charged to the vessel. The amount of work required to effect pressurisation will of course depend on the compressibility of the transfer liquid but this will be much less than the work required to pressurise the vessel and contents if the extraction vessel had been charged with the particulate solid and then pressurised directly by introducing the gaseous extraction solvent.

The extraction vessel may be charged with the particulate solid and the transfer liquid separately, e.g. by putting the required amount of particulate solids into the vessel and then displacing the gas, e.g. air, from the vessel by the transfer liquid, or the vessel may be charged with a slurry of the particulate solid in the transfer liquid.

Where the extraction is performed at an elevated temperature, it may be desirable to charge the vessel with the particulate solid and transfer liquid at the desired extraction temperature: alternatively the vessel may be heated to the desired temperature after filling or after displacement of the transfer liquid therefrom.

The vessel is preferably pressurised after filling by pumping into the vessel a further quantity of the transfer liquid, although any heating step may at least partially effect pressurisation.

In another form of the invention the particulate solid and transfer liquid are charged to an extraction vessel already containing extraction solvent at an elevated pressure, preferably at a pressure substantially equal to the displacement pressure, by pumping in a slurry of the particulate solid in the transfer liquid to displace extraction solvent from the extraction vessel into a storage vessel.

It will be appreciated that in this latter form of the invention the amount of particulate solid and transfer liquid introduced need not be such as to completely fill the extraction vessel: thus the amount of transfer liquid employed need only be that that is necessary to introduce the requisite amount of particulate solid.

In either of the above forms of the invention, preferably the vessel is pressurised substantially to the desired extraction pressure prior to displacement of the transfer liquid. In this case the displacement pressure is substantially equal to the extraction pressure. In other cases it may be desirable to pressurise the extraction vessel, prior to displacement, only to a pressure that is less than the desired extraction pressure, then to effect displacement and thereafter increase the pressure to the extraction pressure.

After extraction, the reverse procedure can be employed for discharge of the residue of the particulate solids remaining in the extraction vessel. Thus extraction solvent can be displaced from the extraction vessel with transfer liquid. The transfer liquid and residual solids can then be discharged from the vessel in readiness for a fresh batch of particulate solids.

Therefore according to a further aspect of the invention we provide, in a process as described above, when the desired degree of extraction has taken place, the following steps:

displacing extraction solvent from the vessel with a transfer liquid, and discharging from said vessel said transfer liquid and the residue of the particulate solid remaining after said extraction.

Again the transfer liquid and the particulate solid residues may be discharged separately or together: thus the transfer liquid can be drawn off into a storage vessel for reuse and then the residual solids discharged.

If the transfer liquid employed in the initial charging and displacement operation is displaced by the extraction solvent into a storage vessel maintained substantially at the displacement pressure, then this stored transfer liquid can be used for displacing the extraction solvent after the extraction step.

The transfer liquid employed preferably has a density greater than that of the extraction solvent at the pressure and temperature at which the displacement takes place, so that displacement of the transfer liquid by the extraction solvent can be effected by gravity, optionally assisted by a pump.

The transfer liquid and the extraction solvent preferably have only a limited miscibility at least at the displacement pressure and temperature so that the amount of extraction solvent transferred from the extraction vessel with the transfer liquid during the displacement operation is small. Even where the transfer liquid is stored at the displacement pressure and used for displacement of the extraction solvent prior to depressurisation after effecting the extraction, if the transfer liquid and extraction solvent have too great a miscibility, an unacceptable loss of pressurised extraction may occur during depressurisation and discharge of the residual solids: while such pressurised extraction solvent may be recovered for re-use, the work required for recompression will offset to some extent the advantages given by the present invention.

However even where the extraction solvent has an appreciable miscibility with the transfer liquid, the process of the present invention may be advantageous since the extraction solvent dissolved in the transfer liquid can be recovered for re-use: whereas, if no transfer liquid is employed, extraction solvent may remain impregnated, or entrained, in the residual solids discharged after extraction.

Likewise excessive solubility of the transfer liquid in the extraction solvent at the displacement pressure and temperature may affect adversely the solution power of the extraction solvent for the material being extracted from the particulate solids. It may therefore be desirable to subject the extraction solvent to a separation process to reduce the concentration of transfer liquid dissolved therein. However in some cases, the presence of a small proportion of transfer liquid dissolved in the extraction solvent may have a beneficial effect on the solubility characteristics of the extraction solvent: in some cases, even though the presence of a small amount of transfer liquid dissolved in the extraction solvent may reduce the solubility of the material being extracted, this small amount of dissolved transfer liquid may assist subsequent separation of the extracted material from the extraction solvent.

Where the material being extracted is liquid at the charging temperature and pressure, in some cases the transfer liquid may be previously extracted liquid: in this case it is necessary that the particulate solid residue is not soluble in the liquid material being extracted so that the transfer liquid can easily be separated from the solid residue after depressurisation.

In many cases water is a suitable transfer liquid, although of course the suitability will depend on the material being extracted and the extraction solvent.

Examples of extraction solvents that may be used include carbon dioxide, nitrogen, nitrous oxide, ammonia, hydrocarbons such as ethane, butane, propane and ethylene, and halogenated hydrocarbons such as methyl chloride. Provided that the material being extracted is soluble therein, carbon dioxide is the preferred extraction solvent because of its cost, availability and nonhazardous nature.

The extracted material may generally be separated from the extraction solvent by changing the pressure and/or temperature of the solution of the extracted material in the extraction solvent: thus reducing the pressure will normally cause the extracted material to separate from the extraction solvent. The extraction solvent from which the extracted material has been removed can then be repressurised and recycled to the extraction vessel. If desired the separation stage can be effected continuously.

One embodiment of the invention is described with reference to the accompanying drawing which is a diagrammatic flow sheet for a system wherein the transfer liquid has a greater density, at the displacement temperature and pressure, than the extraction solvent.

The apparatus comprises an extraction vessel A provided with a solids feed line 1, fitted with a valve V1; a transfer liquid inlet line 2, connected to a supply of transfer liquid via a high pressure pump P1 which has a bypass 2a provided with a valve V2; a vent line 3, fitted with valve V3; extraction solvent inlet and outlet lines 4 and 5, fitted with valves V4 and V5 respectively; a discharge line 6, fitted with a valve V6; and an extraction solvent displacement line 7, fitted with a valve V7.

The ports connecting lines 2, 3, 4, 5 and 7 to vessel A are provided with means, e.g. sieves or filters, to prevent the particulate solid material from passing along those lines.

Adjacent to vessel A but located at a lower level is a displacement vessel B. Extraction solvent displacement line 7 connects to the top of vessel B while a branch 8 of transfer fluid inlet line 2 connects to the bottom of vessel B via a pump P2 which is provided with a by-pass 8a fitted with a valve V8.

Pumps P1 and P2 are provided with non-return valves NV1 and NV2.

A by-pass 9, fitted with a valve V9 is fitted between the extraction solvent inlet and outlet lines 4 and 5; a transfer liquid separator (not shown) may be provided, if necessary, in this, or another by-pass between extraction solvent inlet and outlet lines 4 and 5.

Extraction solvent outlet line 5 is connected, via an expander C to a separator D which is provided with a product outlet line 10 and an extraction solvent return line 11 which, in turn, is connected to the extraction solvent inlet line 4 via a compressor E.

An extraction solvent recovery vessel F is provided below extraction vessel A and is fed by discharge line 6. An extraction solvent recovery line 12 from vessel F is connected to the extraction solvent inlet line 4 via a compressor G. An extraction solvent make-up line 13 is also connected to recovery line 12.

Vessel F is also provided with an outlet line 14 leading to a solids separator 15, e.g. a sieve.

At the start of an extraction cycle vessel A is empty and vessel B is partially filled with transfer liquid, e.g. water, with the remainder of vessel B filled with extraction solvent, e.g. carbon dioxide: vessel B and its contents are maintained at the extraction pressure. All valves, except V9, are closed. Valves V3 and V1 are then opened and the extraction vessel A is charged with the solid particulate material, for example rape seeds that have been subjected to a conventional pretreatment e.g. steam conditioning and cracking, through feed line 1. Feed line valve V1 is then closed. Valve V2 is then opened and extraction vessel A is filled with the transfer liquid, e.g. water, through transfer liquid inlet line 2, displacing gas, e.g. air, from the extraction vessel A through vent line 3. When the vessel A is full, the transfer liquid inlet valve V2 and vent line valve V3 are closed.

The extraction vessel A and its contents are then pressurised to the pressure in vessel B by pumping a further quantity of transfer liquid into vessel A by means of high pressure pump P1.

Valves V7 and V8 are then opened so that the transfer liquid in vessel A flows, under gravity, into vessel B, displacing extraction solvent therefrom into vessel A via line 7. When all the transfer liquid has been displaced from extraction vessel A, valves V7 and V8 are closed, valves V4 and V5 are opened, and valve V9 is closed.

Extraction solvent thus circulates through the particulate solid in vessel A from inlet line 4 and out through outlet line 5. The pressure on the extraction solvent containing the extracting material is reduced in expander C to such a pressure that the extracted material separates from the extraction solvent. The mixture passes to separator D where the separated extracted material is removed via produce outlet line 10. The extraction solvent is then recompressed by compressor E (which is conveniently driven from a turbine in expander C) and returned to the extraction vessel via inlet line 4.

When the desired degree of extraction has been effected, by-pass valve V9 is opened and valves V4 and V5 closed. This enables the extraction solvent to continue circulation through the expander C, separator D, and compressor E and, if used, through the transfer liquid separator.

Valve V7 is then opened and transfer liquid is pumped from vessel B via pump P2 into extraction vessel A until the extraction solvent has been displaced from extraction vessel A into vessel B. Valve V7 is then closed and vent valve V3 opened to relieve the pressure in vessel A. The discharge line valve V6 is then opened to allow the transfer liquid plus residual solids in vessel A to be discharged, under gravity, into vessel F. Any residual extraction solvent, e.g. entrained or dissolved, in the transfer liquid is recovered from vessel F, via line 12 and recompressed, together with make-up extraction solvent, by compressor G and returned to the extraction solvent inlet line 4. If desired, any extraction solvent vented through vent line 3 during decompression of vessel A can be recovered and recycled, via a compressor, e.g. compressor G, to the extraction solvent inlet line 4.

The residual solids are then separated from the transfer liquid at solids separator 15. The transfer liquid from which the residual solids have been separated can, if desired, be recycled to the supply of transfer liquid.

Valve V6 is then closed and valve V1 opened and the cycle repeated.

It will be appreciated that there may be a series of extraction vessels A to which the above procedure is effected cyclically so that one vessel is being subjected to the above discharging and recharging procedure while the extraction stage is being performed in the other vessel or vessels.

It will be appreciated that in such an arrangement employing a plurality of extraction vessels, each extraction vessel may be provided with an associated displacement vessel: in that case the transfer liquid displaced into the associated displacement vessel prior to extraction can be utilised for displacing the extraction solvent from that extraction vessel upon completion of the extraction. Alternatively a single displacement vessel may be employed for use with a plurality of extraction vessels. In this case the transfer liquid displaced into the displacement vessel from one extraction vessel prior to extraction of the material in that extraction vessel may be used as the transfer liquid for displacing extractions solvent from another extraction vessel after the completion of the extraction in that other extraction vessel.

If the invention is applied to the extraction of oil from rape seed using supercritical carbon dioxide in an arrangement of the type shown in the aforementioned drawing, with an extraction vessel A of 1 m$^3$ capacity and a 0.5 to charge thereto of cracked rape seed containing about 40% by weight of oil, calculation from solubility data of vegetable oils in carbon dioxide shows that the bulk of the oil can be extracted and separated by circulating the carbon dioxide at a rate of about 12.3 kg/sec for about 30 minutes round the extraction system with a pressure of 400 bar (gauge) and a temperature of 80° C. in vessel A and a pressure of 200 bar (gauge) in separation vessel D.

Calculation further shows that, using water at 80° C. as the transfer liquid, the amount of carbon dioxide discharged via vent line 3 and dissolved in the water discharged to vessel F on completion of extraction of that batch of seed will be, very approximately, about 50 kg. In contrast, if no transfer liquid were to be employed, the amount of carbon dioxide that would have to be vented would be, very approximately, about 390 kg. While in each case the bulk of the carbon dioxide could be recovered and re-compressed, it is seen that the use of the invention saves, in terms of operating costs, the cost of re-compression of, very approximately, about 340 kg of carbon dioxide per 0.5 te (tonne-SI for 1000 kg) of seeds treated at the expense of the relatively small costs of the transfer operations and of pressurising the extraction vessel containing the charge of seeds and the water to the extraction pressure.

In an alternative embodiment the apparatus shown in the drawing is modified slightly. Lines 1, 2a and 3, and their associated valves V1, V2 and V3 are omitted, while line 8 is connected directly to the base of vessel A instead of to line 2 with a screen provided to prevent the passage of the particulate material along line 8. The screen in the line 2 is omitted. A transfer liquid storage vessel H (not shown) is provided connected to the base of vessel B via a line (not shown) having a valve Vx (not shown) and a by-pass provided with a pump and non-return valve (also not shown).

In this embodiment, at the completion of an extraction, after discharge of the solids residue, vessel A contains extraction solvent at elevated pressure while vessel B contains transfer liquid also at elevated pressure. Valves V4, V5, V6, V8 and Vx are closed and valves V7 and V9 are open. A slurry of the particulate material in transfer liquid is then pumped by pump P1 into vessel A via line 2, displacing extraction solvent from vessel A into vessel B via line 7. To accommodate this extraction solvent in vessel B, an equivalent amount of transfer liquid is transferred from vessel B via valve Vx into storage vessel H.

When the requisite amount of slurry has been introduced into vessel A, valve Vx is closed and valve V8 opened allowing the transfer liquid in vessel A to flow into vessel B displacing extraction solvent therefrom into vessel A via line 7 as in the previous embodiment. Extraction proceeds as in the previous embodiment.

On completion of extraction, valves V4 and V5 are closed and valves V7 and V9 opened and extraction solvent is displaced from vessel A into vessel B via line 7 by transfer liquid pumped by pump P2 from vessel B into vessel A along line 8. Valve V6 is then opened and the transfer liquid and residual solids in vessel A are displaced into vessel F. At the same time transfer liquid from vessel H is pumped back into vessel B displacing extraction solvent therefrom via line 7 into vessel A. When the transfer liquid and residual solids have been displaced from vessel A, valve 6 is closed. The transfer liquid and residual solids are then discharged as before from vessel F.

I claim:

1. A process for the extraction of a material from a particulate solid comprising the steps of:
   (a) charging into an extraction vessel a particulate solid containing an extractable material and a transfer liquid for pressurizing the reaction vessel, the amount of transfer liquid being such that the vessel is pressurized to an elevated pressure,
   (b) displacing the transfer liquid from the extraction vessel by transferring into the extraction vessel, at said elevated pressure, an extraction solvent that is adapted to extracture material from particulate solid and is gaseous at ambient temperature and atmospheric pressure, the transfer liquid being liquid both at ambient temperature and atmospheric pressure and at the pressure and temperature at which the displacement is effected,
   (c) extracting the material from the particulate solid with the extraction solvent,
   (d) separating the extracted material from the extraction solvent, and
   (e) after extraction of the material from the particulate solid, discharging the residue of the particulate solid from the extraction vessel.

2. A process according to claim 1 wherein the extraction vessel is charged at atmospheric pressure with the particulate solid and a sufficient amount of the transfer liquid that the vessel is filled with the particulate solid and transfer liquid and then the pressure in the vessel is increased to the elevated pressure by pumping in a further quantity of the transfer liquid.

3. A process according to claim 1 wherein the particulate material is charged to the extraction vessel as a slurry in the transfer liquid by pumping the slurry into the extraction vessel containing extraction solvent at the elevated pressure, the extraction solvent being displaced from the extraction vessel into a storage vessel as the slurry is introduced.

4. A process according to claim 3 wherein the transfer liquid is displaced from the extraction vessel after charging the particulate solid thereto by transferring extraction solvent from the storage vessel into the extraction vessel.

5. A process according to claim 1 wherein the extraction of the material from the particulate solid with the extraction solvent is effected at an elevated pressure that is substantially equal to the pressure at which the transfer liquid is liquid by the extraction solvent.

6. A process according to claim 1 wherein the transfer liquid is displaced from the extraction vessel into a storage vessel containing extraction solvent at the elevated pressure by transferring the extraction solvent from the storage vessel into the extraction vessel.

7. A process according to claim 1 wherein, after the desired degree of extraction has taken place, extraction solvent is displaced from the extraction vessel with a transfer liquid, and then the transfer liquid and the residue of the particulate solid remaining after said extraction are discharged from the extraction vessel.

8. A process according to claim 7 wherein extraction solvent dissolved in the transfer liquid discharged from the extraction vessel is recovered for re-use.

9. A process according to claim 7 wherein the extraction solvent is displaced from the extraction vessel, after the extraction, into a storage vessel containing transfer liquid at the elevated pressure by transferring the transfer liquid from the storage vessel into the extraction vessel.

10. A process according to claim 7 wherein, after charging the extraction vessel with the particulate solid and the transfer liquid so that the extraction vessel is pressurised to the elevated pressure, the transfer liquid is displaced from the extraction vessel into a storage vessel containing extraction solvent at the elevated pressure by transferring the extraction solvent from the storage vessel into the extraction vessel and, after the extraction, the extraction solvent is displaced from the extraction vessel into the storage vessel by transferring the transfer liquid from the storage vessel into the extraction vessel.

11. A process according to claim 10 wherein at the pressure and temperature at which the transfer liquid is displaced from the extraction vessel, the transfer liquid has a density greater than that of the extraction solvent.

12. A process according to claim 1 wherein, at the pressure and temperature at which the transfer liquid is displaced from the extraction vessel, the extraction solvent is a liquid or supercritical fluid.

13. A process according to claim 1 for the extraction of oil from oilseed wherein the transfer liquid is water and the extraction solvent is carbon dioxide.

* * * * *